United States Patent [19]

Kohno et al.

[11] Patent Number: 5,364,925
[45] Date of Patent: Nov. 15, 1994

[54] AN EPOXY RESIN ADVANCED WITH A DIHYDRIC PHENOL AND FURTHER CHAIN EXTENDED WITH AN ADDITIONAL DIHYDRIC PHENOL FOR USE IN ELECTRICAL LAMINATES

[75] Inventors: Masahiko Kohno, Susono; Takahiko Ohmura, Gotemba, both of Japan

[73] Assignee: The Dow Chemical Company, Midland, Mich.

[21] Appl. No.: 106,190

[22] Filed: Aug. 13, 1993

Related U.S. Application Data

[63] Continuation of Ser. No. 825,696, Jan. 27, 1992, abandoned.

[51] Int. Cl.$^5$ .............................................. C08G 59/00
[52] U.S. Cl. .................................. 528/104; 528/103; 528/106; 528/107; 528/113; 525/524; 525/529; 525/532
[58] Field of Search ................ 528/104, 103, 106, 107, 528/113; 525/524, 529, 532

[56] References Cited

U.S. PATENT DOCUMENTS

| | | | |
|---|---|---|---|
| 2,668,807 | 2/1954 | Greenlee | 260/47 |
| 2,945,004 | 7/1960 | Greenlee | 260/47 |
| 3,931,109 | 1/1976 | Martin | 528/89 |
| 4,251,594 | 2/1981 | Davis et al. | 428/413 |
| 4,421,877 | 12/1983 | Alvino | 523/456 |
| 4,568,735 | 2/1986 | Li | 528/89 |
| 4,661,568 | 4/1987 | Koenig et al. | 525/510 |
| 4,710,429 | 12/1987 | Bogan et al. | 428/417 |
| 4,713,137 | 12/1987 | Sexton | 156/233 |
| 4,868,059 | 9/1989 | Walker et al. | 428/416 |
| 4,874,669 | 10/1989 | Larson et al. | 525/481 |
| 4,895,755 | 1/1990 | Berman et al. | 525/482 |
| 5,141,974 | 8/1992 | Konishi et al. | 525/481 |

*Primary Examiner*—Melvyn I. Marquis
*Assistant Examiner*—Randy Gulakowski

[57] ABSTRACT

An epoxy resin composition useful in an electrical laminate, which composition comprises:

(A) an epoxy resin prepared by reacting (A-1) an epoxy resin having an average of more than one, but less than three epoxy groups per molecule and (A-2) a phenolic compound having an average of more than one, but less than three hydroxyl groups per molecule at a ratio to provide an epoxy to phenolic equivalent ratio of 1:x;

(B) y equivalent of a phenolic compound having an average of more than one, but less than three hydroxyl groups per molecule; and (C) at least one catalyst for catalyzing a reaction of Component (A) and Component (B);

wherein x and y satisfy the following equations:

$x \geq 0.01$ $y \geq 0.01$ $0.02 \leq x + y < 1.00$.

The disclosed epoxy resin composition, exhibits low viscosity when dissolved in an organic solvent and good heat resistance when cured.

10 Claims, No Drawings

AN EPOXY RESIN ADVANCED WITH A DIHYDRIC PHENOL AND FURTHER CHAIN EXTENDED WITH AN ADDITIONAL DIHYDRIC PHENOL FOR USE IN ELECTRICAL LAMINATES

CROSS-REFERENCE TO RELATED APPLICATION

This is a continuation of application Ser. No. 07/825,696, filed Jan. 27, 1992 now abandoned.

BACKGROUND OF THE INVENTION

The present invention relates to an epoxy resin composition useful in an electrical laminate. More particularly, the present invention relates to an epoxy resin composition for use in an electrical laminate, which exhibits low viscosity when dissolved in an organic solvent and good heat resistance when cured.

Epoxy resins have been used as materials for electrical/electronics equipment, such as materials for electrical laminates because of their superiority in heat resistance, chemical resistance, insulation property, dimensional stability, adhesiveness and the like. Most electrical laminates have been made from a varnish comprising a brominated epoxy resin, prepared from the reaction of a certain amount of diglycidyl ether of bisphenol A and a certain amount of tetrabromobisphenol A, dissolved in an organic solvent.

In general, to provide sufficient flame retardancy, the brominated epoxy resins used for preparation of laminates contain 20 to 23 weight percent of bromine. Thus, the conventional brominated epoxy resins usually have a tetrabromobisphenol A content of 34 to 39 weight percent. For this reason, it has been considered difficult to decrease the viscosity of a solution of such brominated epoxy resin by using a brominated epoxy resin having low molecular weight.

Further, the electrical laminates prepared from the brominated epoxy resins as described above have low glass transition temperature (Tg), e.g., 125° C., and thus are not good for practical use. To improve heat resistance, approximately 15 parts by weight of cresol epoxy novolac resin is added to prepare an electrical laminate having a glass transition temperature of about 135° C.

For ease of handling of an epoxy resin during preparation of prepreg, a solution containing the epoxy resin should preferably have lowest possible viscosity, but use the least amount of an organic solvent as possible. However, as mentioned above, it is difficult to sufficiently decrease the viscosity of the conventional epoxy resin solutions or difficult to decrease the amount of the organic solvent employed.

Furthermore, it is desirable to improve the heat resistance of the electrical laminates without using a relatively expensive resin, such as cresol epoxy novolac resin, if possible.

In view of the deficiencies of conventional epoxy resin compositions, it would be desirable to provide an epoxy resin composition useful in electrical laminates, which exhibits low viscosity when dissolved in an organic solvent and good heat resistance when cured.

SUMMARY OF THE INVENTION

According to the present invention, there is now provided an epoxy resin composition useful in an electrical laminate, which comprises:

(A) an epoxy resin prepared by reacting (A-1) an epoxy resin having an average of more than one, but less than three epoxy groups per molecule and (A-2) a phenolic compound having an average of more than one, but less than three hydroxyl groups per molecule at a ratio to provide an epoxy to phenolic equivalent ratio of 1:x;

(B) y equivalent of a phenolic compound which may be the same as or different than Component (A-2) and having an average of more than one, but less than three hydroxyl groups per molecule; and (C) at least one catalyst for catalyzing the reaction of Component (A) and Component (B);

wherein x and y satisfy the following equations:

$$x \geq 0.01$$

$$y \geq 0.01$$

$$0.02 \leq x + y < 1.00.$$

Another aspect of the present invention relates to an electrical laminate prepared from the above-mentioned epoxy resin composition.

Still another aspect of the present invention relates to a process for preparing an electrical laminate which comprises the steps of (a) impregnating a substrate or web with the above-mentioned epoxy resin composition; (b) heating the thus prepared impregnated item ("prepreg"); (c) fabricating the prepreg into an electrical laminate by laminating one or more layers of the prepreg with an electrical conductive material; and (d) heating the thus prepared laminate at elevated temperature and pressure to suitably melt and cure the epoxy resin in the laminate.

In the present invention, suitable epoxy resins, Component (A-1) include diglycidyl ethers of bisphenol A. Suitable phenolic compounds, Component (A-2) include tetrabromobisphenol A. To provide better stability, the epoxy resin composition of the present invention may further comprise a stabilizer such as methyl-p-toluenesulfonate, ethyl-p-toluenesulfonate and methyl-p-chlorobenzenesulfonate. To further improve heat resistance, the epoxy resin composition of the present invention may further comprise a multi-functional epoxy resin having an average of at least three epoxy groups and/or a phenolic compound having an average of at least three hydroxyl groups.

According to the present invention, it is possible to reduce the viscosity of the epoxy resin solution even if the same amount of an organic solvent is used as in a conventional epoxy resin solution, or possible to reduce the amount of the organic solvent used to obtain an epoxy resin solution having the same viscosity as a conventional epoxy resin solution. Further, cured products obtained from the epoxy resin composition of the present invention have improved heat resistance without addition of a multi-functional epoxy resin, and thus can be effectively used on an industrial scale.

DETAILED DESCRIPTION OF THE INVENTION

In the present invention, any known epoxy resins having an average of more than one, but less than three epoxy groups per molecule, can be used as Component (A-1). Suitable epoxy resins as used herein include, for example, those having an epoxy equivalent of about 170 to about 3,500, more suitably about 175 to about 1,000, and a weight average molecular weight of about 340 to about 18,000, suitably about 340 to about 3,000. Such epoxy resins are well described in, for example, U.S. Pat. Nos. 4,251,594; 4,661,568; 4,710,429; 4,713,137; and 4,868,059, and "The Handbook of Epoxy Resins" by H. Lee and K. Neville, published in 1967 by McGraw-Hill, New York, all of which are incorporated herein by reference.

Suitable epoxy resins which can be used as Component (A-1) in the present invention may be represented by the general formula:

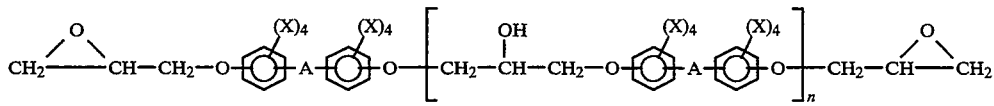

wherein each A is independently a divalent hydrocarbon group having from 1 to 8 carbon atoms, —CO—, —O—, —S—, —S—S—, S(O)2—, —SO—,

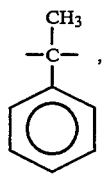

or a covalent bond; each X is independently hydrogen, halogen or an alkyl group of 1 to about 4 carbon atoms and n is an average value of 0 to about 3 depending on the desired molecular weight of epoxy resin. The epoxy resins can be prepared from epichlorohydrin and a dihydric phenol. Preferred epoxy resins, Component (A-1) are those having two vicinal epoxy groups such as diglycidyl ethers of bisphenol A, bisphenol K, bisphenol F, bisphenol S, bisphenol AD, brominated derivatives thereof and mixtures thereof. The most preferred epoxy resin is diglycidyl ether of bisphenol A. As commercially available epoxy resins, D.E.R. TM 331L; D.E.R. TM 383J; D.E.R. TM 661; D.E.R. TM 664; D.E.R. TM 667; and D.E.R. TM 669 (Trademark of The Dow Chemical Company) available from The Dow Chemical Company, can be used.

In the present invention, any known phenolic compounds having an average of more than one, but less than three hydroxyl groups per molecule, can be used as Component (A-2). Such phenolic compounds are well described in, for example, U.S. Pat. Nos. 4,251,594; 4,661,568; 4,710,429; 4,713,137; and 4,868,059, all of which are incorporated herein by reference. Suitable phenolic compounds, which can be used in the present invention as Component (A-2), include, for example, bisphenols such as those represented by the formula:

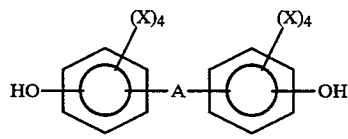

wherein X and A are as defined above. Examples of the suitable epoxy resins are those having two hydroxyl groups such as bisphenol A, bisphenol K, bisphenol F, bisphenol S, bisphenol AD, halogenated derivatives thereof and mixtures thereof. The most suitable phenolic compound is a halogenated bisphenol A, particularly tetrabromobisphenol A.

In the present invention, the phenolic compounds as described above as Component (A-2) can be also used as Component (B). Usually, the same kinds of phenolic compounds are used for Component (A-2) and Component (B). It is possible to use different kinds of phenolic compounds for Component (A-2) and Component (B). The kinds and the amount of Component (A-2) and Component (B) may be determined in such manner that the halogen (preferably bromine) content of the final product ranges about 15 to about 35, preferably about 18 to about 23 weight percent.

The epoxy resin composition of the present invention comprises an epoxy resin, Component (A) prepared by reacting an epoxy resin, Component (A-1) and a phenolic compound, Component (A-2) at a ratio to provide an epoxy to phenolic equivalent ratio of 1:x; and y equivalent of a phenolic compound, Component (B). The values, x and y satisfy the following equations:

$$x \geq 0.01$$

$$y \geq 0.01$$

$$0.02 \leq x+y < 1.00;$$

preferably $$x \geq 0.01$$

$$y \geq 0.01$$

$$0.24 \leq x+y \leq 0.50;$$

and more preferably $$x \geq 0.14$$

$$y \geq 0.01$$

$$0.30 \leq x+y \leq 0.44.$$

In the case of using halogen free epoxy resins as Component (A-1), if x is less than 0.01 in the above equations, it is difficult to obtain epoxy resins having sufficient softening point and melting point. If y is less than 0.01, the resultant epoxy resin solution may not have sufficiently low viscosity and the cured product may have a low glass transition temperature. On the other hand, if the sum of x and y is less than 0.02, a halogen-containing phenolic component cannot be sufficiently introduced into the final product, resulting in poor flame retardancy. In the case of using a glycidyl ether of brominated bisphenol A as Component (A), an amine catalyst is not suitable due to free bromine which may easily be separated from the glycidyl ether. If the sum of x and y is 1.00 or more, unreacted phenolic hydroxyl groups will remain in the cured product due to use of excess amount of the phenolic components. The unreacted phenolic hydroxyl groups will decrease cross-linking density of the cured product, resulting in poor properties thereof.

The epoxy resin compositions of the present invention comprise, as Component (C), catalysts for catalyzing the reaction of Component (A-1) and Component (B). Suitable catalysts are described in, for example, U.S. Pat. Nos. 3,306,872; 3,341,580; 3,379,684; 3,477,990;, 3,547,881; 3,637,590; 3,843,605;, 3,948,855; 3,956,237; 4,048,141;, 4,093,650; 4,131,633; 4,132,706; 4,171,420; 4,177,216; 4,302,574; 4,320,222; 4,358,578; 4,366,295; and 4,389,520.

Examples of the suitable catalysts are imidazoles such as 2-methylimidazole; tertiary amines such as triethylamine, tripropylamine and tributylamine; phosphonium salts such as ethyltriphenylphosphonium chloride, ethyltriphenylphosphonium bromide and ethyltriphenylphosphonium acetate; and ammonium salts such as benzyltrimethylammonium chloride and benzyltrimethylammonium hydroxide. It was found that the absence of catalysts for promoting a reaction of an epoxy group and a phenolic hydroxyl group results in the decrease in glass transition temperature of the resultant product. The amount of the catalysts used generally ranges from about 0.001 to about 1 weight percent, preferably from about 0.01 to about 0.1 weight percent, based on the total weight of the reaction mixture.

The epoxy resin composition of the present invention may comprise known curing agents. Such curing agents include, for example, amine curings agents such as dicyandiamide, diaminodiphenylmethane and diaminodiphenylsulfone; anhydrides such as hexahydroxyphthalic anhydride; imidazoles; and phenolic curing agents such as phenol novolac resins. The amount of the curing agents used preferably ranges from about 0.3 to about 1.0 equivalent per epoxy equivalent of the epoxy resin, Component (A). In this case, the amount of the curing agent may be calculated with the assumption that Component (A-1) as epoxy component and Component (A-2) as phenolic component are completely reacted. The use of an excess amount of the curing agents may decrease the glass transition temperature of the resultant product.

To make handling of the compositions easier, a suitable organic solvent may be added since the above compositions are usually found in the solid form at standard conditions. Known organic solvents can be used. These include ketones such as acetone and methyl ethyl ketone; alcohols such as methanol and ethanol: glycol ethers such as ethylene glycol methyl ether and propylene glycol monomethyl ether; amides such as N,N-dimethylformamide; aromatic organic solvents such as toluene and xylene; aliphatic hydrocarbons; cyclic ethers; and halogenated hydrocarbons.

In the preferred embodiment of the present invention, the epoxy resin composition comprises an epoxy resin prepared by reacting an epoxy resin, Component (A-1) with a halogenated phenolic compound, Component (A-2) at such a ratio that the amount of the halogenated phenolic compound is less than that required to provide sufficient halogen content to the final cured product. However, the composition of the present invention further comprises an unreacted halogenated phenolic compound, Component (B) to supplement the insufficient halogen content to provide a final cured product having sufficient flame retardancy and improved heat resistance. On the other hand, since the whole necessary amount of the halogenated phenol component is not reacted and some portion of the phenol component remains unreacted, the solution of the epoxy resin composition according to the present invention can nave lower viscosity than the conventional epoxy resin solutions when the same amount of the organic solvent is used.

In the practice of the present invention, the amount of the organic solvent employed may range from about 10 to about 25 parts by weight, preferably from about 15 to about 20 parts by weight, based on 100 parts by weight of the above epoxy resin composition.

To improve storage stability, the epoxy resin compositions of the present invention may comprise a suitable stabilizer. The suitable stabilizers as used herein include, for example, alkylphenylsulfonates or halogenated alkylphenylsulfonates such as methyl-p-toluenesulfonate, ethyl-p-toluenesulfonate and methyl-p-chlorobenzenesulfonate. The most suitable stabilizer is methyl-p-toluenesulfonate. The stabilizer may suitably be used in an amount of about 0.001 to about 10 weight percent, more suitably about 0.01 to about 2 weight percent, based on the total amount of the composition.

To further improve heat resistance, the epoxy resin compositions of the present invention may further comprise a small amount (e.g., about 1 to about 10 weight percent) of a known multi-functional epoxy resin such as a cresol epoxy novolac resin.

As desired, the epoxy resin compositions of the present invention may comprise an effective amount of a reaction accelerator, pigment, dye, filler, surfactant, flow rate modifier, flame retardant and mixtures thereof.

A process for preparing an electrical laminate using the epoxy resin compositions of the present invention will be described below.

First, the above-mentioned organic solvent, curing agent and other desired additives are mixed with the epoxy resin composition of the present invention to prepare an epoxy varnish. Then, the varnish is impregnated into a substrate or web. The obtained impregnated substrate is dried at, for example, about 80 to about 200° C., preferably about 100 ° to about 200° C. for about 0.5 to about 60 minutes, preferably about 0.5 to about 30 minutes to obtain half cured epoxy based prepreg. As used herein, the substrates include, for example, glass cloth, a glass fiber, glass paper, paper, polyethylene and polypropylene.

The obtained prepreg is cut into a desired size. A plurality of the cut prepregs (desired number, e.g., 2 to 10 pieces) are laminated and subjected to pressing at a pressure of, e.g., about 10 to about 50 Kg/cm$^2$, at about 130 ° to about 180° C. for about 0.5 to about 3 hours to obtain a laminate. An electrical conductive layer is formed on the laminate with an electrical conductive material. As used herein, suitable electrical conductive materials include electrical conductive metals such as copper, gold, silver, platinum and aluminum.

The electrical laminates manufactured as described above can be preferably used as copper clad laminates and multi-layer printed circuit boards for electrical or electronics equipment.

The present invention will be described in more detail with reference to the following Examples and Comparative Examples, which are not to be construed as limiting. Unless otherwise indicated, "part" means "part by weight".

EXAMPLE 1

In a reaction vessel, 61.5 g of diglycidyl ether of bisphenol A, 9.6 g of tetrabromobisphenol A and a 70% methanol solution of 0.03 g of ethyltriphenylphosphonium acetate were reacted at 70° C. with stirring.

Then, 33.3 g of methyl ethyl ketone was added to the reaction mixture to reduce the reaction temperature to 50° C. Thereafters 28.9 g of tetrabromobisphenol A and 0.2 g of p-toluenesulfonic acid were added and mixed well by agitation.

To 133 parts of the thus obtained brominated epoxy resin, 3.5 parts of dicyandiamide, 15 parts of dimethylformamide, 15 parts of propylene glycol methyl ether and 2 parts of a 100% methanol solution of 2-ethyl-4-methylimidazole, were added to prepare an epoxy varnish.

The resulting varnish was thinly coated on a copper plate heated at 175° C., and kept for 1 hour to obtain a cured product in the form of film. The glass transition temperature of the cured product was measured with a differential scanning calorimeter at a temperature increase rate of 10° C./minute.

The properties of the brominated epoxy resin produced and the resulting cured product are as shown in Table 1.

EXAMPLE 2

The same procedures of Example 1 were repeated to prepare a brominated epoxy resin except that the amount of tetrabromobisphenol A first reacted with diglycidyl ether of bisphenol A was changed to 19.3 g, and the amount of unreacted tetrabromobisphenol A was changed to 19.3 g.

The resin and the cured product obtained were evaluated in the same manner as in Example 1. The results are as shown in Table 1.

EXAMPLE 3

The same procedures of Example 1 were repeated to prepare a brominated epoxy resin except that the amount of tetrabromobisphenol A first reacted with diglycidyl ether of bisphenol A was changed to 28.9 g, and the amount of unreacted tetrabromobisphenol A was changed to 9.6 g.

The resin and the cured product obtained were evaluated in the same manner as in Example 1. The results are as shown in Table 1.

Comparative Example 1

The same procedures of Example 1 were repeated to prepare a brominated epoxy resin except that tetrabromobisphenol A was not first reacted with diglycidyl ether of bisphenol A, and the amount of unreacted tetrabromobisphenol A was changed to 38.5 g.

Comparative Example 2

The same procedures of Example 1 were repeated to prepare a brominated epoxy resin except that the amount of tetrabromobisphenol A first reacted with diglycidyl ether of bisphenol A was changed to 38.5 g, and no unreacted tetrabromobisphenol A was added later.

The resin and the cured product obtained were evaluated in the same manner as in Example 1. The results are as shown in Table 1.

EXAMPLE 4

To 133 parts of the brominated epoxy resin obtained in Example 3, 15 parts of cresol epoxy novolac resin, 3.7 parts of dicyandiamide, 18.5 parts of dimethylformamide, 18.5 parts of propylene glycol methyl ether and 2.0 parts of a 10% methanol solution of 2-ethyl-4-methylimidazole, were added to prepare an epoxy varnish. Thereafter, the procedures of Example 1 were repeated to evaluate the resulting epoxy resin and the cured product.

The results are as shown in Table 1. In Table 1, "Ratio of pre-reacted TBBA" indicates the amount of TBBA which was pre-reacted with diglycidyl ether of bisphenol A: "Epoxy Eq." means the epoxy equivalent of the brominated epoxy resins; "Viscosity" and "Nonvolatiles Content" refer to the varnish; and "Tg" means a glass transition temperature of the cured products obtained.

TABLE 1

| Example No. | Ratio of pre-reacted TBBA (%) | Epoxy Eq. | Viscosity (cSt) | Nonvolatiles Content (%) | Tg (°C.) |
|---|---|---|---|---|---|
| Ex. 1 | 25 | 336 | 47 | 75.7 | 134 |
| Ex. 2 | 50 | 384 | 94 | 75.5 | 134 |
| Ex. 3 | 75 | 444 | 220 | 75.7 | 132 |
| Comp. Ex. 1 | 0 | 301 | 23 | 75.2 | 135 |
| Comp. Ex. 2 | 100 | 523 | 630 | 75.2 | 125 |
| Ex. 4 | 50 | 342 | — | 75.3 | 144 |

As apparent from the results shown in Table 1, the epoxy resin solutions obtained in Examples 1 to 3 exhibited sufficiently low viscosity to prepare prepreg. The cured products obtained in Examples 1 to 3 exhibited sufficient glass transition temperature, i.e., 132° to 134° C. In Example 4, the glass transition temperature of the cured product was remarkably improved because of addition of a multi-functional epoxy resin to the composition of Example 2.

On the other hand, the epoxy resin solution obtained in Comparative Example 2 exhibited high viscosity. Also, the cured product obtained in Comparative Example 1 showed a low glass transition temperature of 125° C. In Comparative Example 1, the entire amount of tetrabromobisphenol A was added to the composition as unreacted phenol component. In this case, the obtained varnish had a low viscosity and showed high glass transition temperature when cured. However, it was difficult to prepare a prepreg having good properties since the solid component of the epoxy solution was unstable immediately after removing the organic solvent due to the low melt viscosity of the solid component.

What is claimed is:

1. An epoxy resin composition comprising the following components dissolved in a solvent:
   (A) an advanced epoxy resin made by reacting:
      (A-1) an epoxy resin having on average more than one and less than three epoxy groups per molecule; with
      (A-2) a dihydric phenol
   in an equivalent ratio of 1:x epoxy group equivalents per phenolic hydroxyl group equivalents, wherein x is at least 0.01;
   (B) a dihydric phenol in an equivalent ratio of 1:y epoxy group equivalents per phenolic hydroxyl group equivalents, wherein y is at least 0.01 and x+y is no more than about 0.5;
   (C) a catalyst for the reaction of components (A) and (B); and
   (D) a curing agent selected from the group consisting of amine curing agents and anhydrides.

2. An epoxy resin composition according to claim 1, wherein Component (A-1) is selected from diglycidyl ethers of bisphenol A, bisphenol K, bisphenol F, bisphenol S, bisphenol AD, brominated compounds thereof and mixtures thereof.

3. An epoxy resin composition according to claim 1, wherein Component (A-2) is selected from halogenated bisphenol A, bisphenol K, bisphenol F, bisphenol S, bisphenol AD, and mixtures thereof.

4. An epoxy resin composition according to claim 1, wherein x and y satisfy the following equations:

$$x \geq 0.14$$

$$y \geq 0.01$$

$$0.030 \leq x+y \leq 0.44.$$

5. An epoxy resin composition according to claim 1, which has a total halogen content of 15 to 35 weight percent.

6. An epoxy resin composition according to claim 1, which has a total halogen content of 18 to 23 weight percent.

7. An epoxy resin composition according to claim 1, which further comprises a stabilizer selected from methyl-p-toluenesulfonate, ethyl-p-toluenesulfonate and methyl-p-chlorobenzenesulfonate.

8. An epoxy resin composition according to claim 1, which further comprises a multi-functional epoxy resin having an average of at least three epoxy groups.

9. An epoxy resin composition according to claim 1 or 4, which further comprises a phenolic compound having an average of at least three hydroxyl groups.

10. An electrical laminate prepared from the epoxy resin composition of claim 1.

* * * * *